(12) United States Patent
Thornton et al.

(10) Patent No.: US 7,885,688 B2
(45) Date of Patent: Feb. 8, 2011

(54) METHODS AND SYSTEMS FOR SIGNAL SELECTION

(75) Inventors: Steven D. Thornton, Rockwall, TX (US); Ross A. McClain, Jr., Greenville, TX (US); Benjamin A. Collins, Greenville, TX (US)

(73) Assignee: L-3 Communications Integrated Systems, L.P., Greenville, TX (US)

( * ) Notice: Subject to any disclaimer, the term of this patent is extended or adjusted under 35 U.S.C. 154(b) by 832 days.

(21) Appl. No.: 11/589,491

(22) Filed: Oct. 30, 2006

(65) Prior Publication Data

US 2008/0102764 A1    May 1, 2008

(51) Int. Cl.
H04M 1/00    (2006.01)
(52) U.S. Cl. .................. 455/562.1; 455/25; 455/101
(58) Field of Classification Search .......... 455/562.1, 455/296, 464, 463; 370/330
See application file for complete search history.

(56) References Cited

U.S. PATENT DOCUMENTS

| | | | | |
|---|---|---|---|---|
| 5,274,844 | A * | 12/1993 | Harrison et al. | 455/25 |
| 5,619,503 | A * | 4/1997 | Dent | 370/330 |
| 5,809,061 | A * | 9/1998 | Shea et al. | 375/141 |
| 5,848,108 | A | 12/1998 | Tong et al. | |
| 6,058,075 | A * | 5/2000 | Bourdelais | 367/103 |
| 6,128,276 | A | 10/2000 | Agee | |
| 6,512,737 | B1 * | 1/2003 | Agee | 370/208 |
| 7,516,471 | B2 | 4/2009 | Visotsky et al. | |
| 2003/0063759 | A1 | 4/2003 | Brennan et al. | |
| 2003/0123384 | A1 | 7/2003 | Agee | |
| 2003/0190897 | A1 * | 10/2003 | Lei et al. | 455/101 |
| 2005/0001765 | A1 * | 1/2005 | Ryu et al. | 342/377 |
| 2006/0223479 | A1 * | 10/2006 | Stanners | 455/296 |
| 2007/0142089 | A1 * | 6/2007 | Roy | 455/562.1 |
| 2008/0112574 | A1 * | 5/2008 | Brennan et al. | 381/92 |

FOREIGN PATENT DOCUMENTS

WO    WO01/41387 A1    6/2001

OTHER PUBLICATIONS

International Search Report, PCT/US07/22275, Mar. 12, 2008, 2 pgs.
Joshi, "Adaptive Beamforming Measurements Using Four-Element Portable and Mobile Arrays", IEEE Transactions on Antennas and Propagation, vol. 53, No. 12, Dec. 2005, 8 pgs.

(Continued)

*Primary Examiner*—Erika A Gary
(74) *Attorney, Agent, or Firm*—O'Keefe, Egan, Peterman & Enders LLP

(57) ABSTRACT

A signal of interest (SOI) may be selected from among a plurality of cochannel signals based on one or more internal or external structural feature/s of the SOI, e.g., automatically selected based on any one or more internal or external structural features of the SOI that is known a priori. Examples of such internal structural features include, but are not limited to, number, frequency and/or absolute or relative signal strength (signal to noise ratio) of one or more transmitted signal components (e.g., pilot tones, squelch tones, etc.) present in the SOI; absence of a signal component at a given frequency in the SOI (i.e., present as a "dead spot" at a given frequency within the SOI); signal strength versus frequency profile of the SOI, signal strength versus time domain profile of the SOI, transient characteristics, time versus frequency profile, etc.

28 Claims, 5 Drawing Sheets

OTHER PUBLICATIONS

Wikipedia, "Squelch", Printed From Internet Aug. 25, 2006, 2 pgs.
"CTCSS, PL, Tone Squelch, and Other Necessary Evils", Printed From Internet Aug. 25, 2006, 4 pgs.
Ziemer et al., "Principles of Communications", Systems, Modulation, and Noise, Second Edition, Houghton Mifflin Company, 1985, 3 pgs.
Van Veen et al., "Beamforming: A Versatile Approach to Spatial Filtering", IEEE ASSP Magazine, Apr. 1988, 21 pgs.
Audio-technica, "Squelch Techniques", Printed From Internet Aug. 25, 2006, 2 pgs.
Altera, "Smart Antennas-Beamforming", Printed From Internet Aug. 26, 2006, 6 pgs.
Copending Patent Application, "Method and Apparatus for Mitigating Port Swapping During Signal Tracking", U.S. Appl. No. 11/368,155, filed Mar. 3, 2006, 24 pgs.
International Search Report, Application No. 200902072-8, Oct. 1, 2010, 5 pgs.

* cited by examiner

METHODS AND SYSTEMS FOR SIGNAL SELECTION

BACKGROUND OF THE INVENTION

1. Field of the Invention

The present invention relates generally to signal reception, and more particularly to selection of received signals.

2. Description of the Related Art

Cochannel signal interference occurs when two or more signals are received at the same time over the same frequency range. For example, cochannel signal interference may be encountered by a receiver that is receiving two or more signals transmitted at the same frequency and at the same time by two or more separate transmitters. In such a case, data (e.g., voice data, text data, etc.) contained in one or more of the interfering cochannel signals cannot be accessed or processed further without first separating the given signal from the other signals to allow demodulation or other further signal processing. This situation occurs frequently with airborne receivers and also occurs with ground system receivers as well. Even signals with carefully planned frequency re-use (such as radio stations), often result in co-channel interference for airborne receivers due to the much longer line-of-sight.

In the past, beamforming and interference cancellation techniques have been employed for purposes of cochannel signal separation. In one example beamforming technique, multiple sensors are employed to separate and copy multiple candidate signals of the same class that are transmitting on the same frequency range or band. These candidate signals include a signal of interest and cochannel interferer signals. In the case of a signal of interest that is a sonobuoy signal, these captured candidate signals are then output as audio on multiple audio ports for a human operator to monitor, and for further acoustic processing of the signal of interest that is selected by the human operator. Besides requiring a human operator to monitor and select the signal of interest, in a non-stationary environment, such as an airborne beamformer platform, the extracted signals can sometimes swap with each other (referred to as "port-swapping") producing the undesirable effect of an operator losing the selected signal being monitored. Port-swapping can also occur when multiple signals become co-linear with respect to the collection sensors. This phenomenon causes disturbances in acoustic processing of the sonobuoy signal, and may require many seconds of additional processing to recover from the disturbance.

Signal transmitting devices have been employed to transmit digitally coded identification information within or in combination with transmitted signals. Although transmitting such identification information enables signals to be identified and assigned to correct ports, it increases the complexity of transmitting devices, requires transmitting devices to be compatible with the communications network by transmitting digitally coded information in the correct format, and increases system complexity by requiring the receiving system to continuously parse and decode information from each signal.

SUMMARY OF THE INVENTION

Disclosed herein are methods and systems that may be implemented to select a signal of interest (SOI) based on one or more internal and/or external structural feature/s of the SOI (e.g., such as relationship of signal strength versus frequency within the SOI). Such a structural feature may be transmitted as a part of the SOI (i.e., a transmitted internal or external structural feature of the SOI), or may be otherwise present as a structural feature of the signal as received. In this regard, an internal structural feature is an intrinsic feature that is present and identifiable within a demodulated signal, and an external structural feature is an intrinsic feature that is present and identifiable within a modulated signal of the SOI. Thus, the disclosed methods and systems may be implemented in one embodiment to select a SOI that is in modulated form, and in another embodiment to select a SOI that is in demodulated form. In either case, the disclosed systems and methods may be advantageously implemented in one embodiment to select a SOI based on one or more internal and/or external structural feature/s of the SOI and not based on digitally coded information and/or other type of information that is present in the SOI, e.g., so that a receiving system does not have to continuously parse and decode information from each signal to select the SOI.

In one embodiment of the disclosed methods and systems, a signal may be automatically selected based on any one or more internal or external structural features of a given SOI that are known, and in one exemplary embodiment that are known a priori. In this regard, a structural feature of a given signal that is known a priori is a structural feature having characteristics that are known before examination of the given signal or without requiring examination of the given signal.

Examples of internal or external structural features include, but are not limited to, number, frequency and/or absolute or relative signal strength (signal to noise ratio) of one or more transmitted signal components (e.g., pilot tones, squelch tones, etc.) present in the SOI; absence of a signal component at a given frequency in the SOI (i.e., present as a "dead spot" at a given frequency within the SOI); signal strength versus frequency profile of the SOI, signal strength versus time domain profile of the SOI, transient characteristics, time versus frequency profile, etc. In one exemplary embodiment, an internal structural feature may be characterized as a frequency marker that is detected to be present in the demodulated message of a SOI. In another exemplary embodiment, the SOI may be assigned to a port once it has been selected based on one or more such internal structural feature/s, and port-swapping may be eliminated or substantially reduced even in the presence of strong constant interferers and push-to-talk interferers, as well as in the presence of other port-swapping causes (e.g., power-level changes, motion, etc.).

The disclosed methods and systems may be employed for selection of a SOI in any application in which a SOI is provided among one or more other signals, e.g., any situation in which two or more cochannel signals exist that are to be separated. One example of such an application is for selection of a SOI that is received with one or more other signals (e.g., interferer signals) at the same frequency range or band. Examples of particular system applications with which the disclosed methods and systems may be implemented include, but are not limited to, phased array antennas (e.g., electrically steered phased array antennas, broad band wide scan angle phased array antennas, broad band multi-octave phased array antennas, etc.), any other types of antenna systems having multiple antenna elements, beamforming networks, microwave phase shifters, radar systems, ECM systems, space communication systems, cellular base stations, direction finding systems, hand-held radio communication devices, one-way or two-way radio communication systems, etc.

In one exemplary embodiment, the disclosed methods and systems may be implemented to automatically select an incoming SOI (e.g., from among a plurality of incoming signals that may include one or more interfering or other signals in combination with the SOI) without human operator intervention and without disturbances over time in continuity of the signal output of the SOI (e.g., without port-swapping or other break in the continuity of the SOI output). This automatic selection may be made (e.g., using software, hardware, firmware, or any combination thereof) to automatically test incoming signals for presence of one or more structural features in a manner described elsewhere herein. In one example, a SOI may be an incoming RF signal (e.g., from a sonobuoy transmitter) that is received at the same frequency range or band with one or more RF interferer signals by an airborne antenna and beamforming system (e.g., that includes adaptive filters that lock onto RF signals with the same primary modulation). The beamforming system may be configured to automatically test incoming signals at the same frequency range or band for structural features of the SOI, such as pilot tone components of the SOI. In such a case, the average frequency bin magnitudes at known frequencies that are targeted by the beamforming system are large relative to the average magnitudes of other frequencies (herein after termed as the "pilot tone ratio") and the signal that exhibits the largest pilot tone ratio may be selected as the signal of interest. Once found, the SOI may be automatically selected by the beamforming system for output so that the continuity of the beamforming system output is not disturbed. In another embodiment, incoming signals may be tested at the same frequency range or band for SOI structural features that represent relatively weak signal components (e.g., "dead spots") in the SOI, in which case the average frequency bin magnitudes at known frequencies that are targeted by the beamforming system may be small relative to the average magnitudes of other frequencies and the signal that exhibits the smallest such dead spot ratio may be selected as the signal of interest.

For example, in one possible implementation, an incoming SOI may be a modulated FM signal that is emitted by a ocean-deployed sonobuoy and that has a signal structure that is known a priori, although it will be understood that the disclosed methods and systems may alternatively be implemented to select signals of interest that are non-FM modulated (e.g., signals that having modulations other than FM modulation). The sonobuoy emits the SOI for collection by a beamforming system (e.g., by an airborne beamforming system) and subsequent analysis by an acoustic processing system for determining the presence of submarines and other vessels or significant objects. The SOI as transmitted by the sonobuoy may include one or more signal components (e.g., two pilot tones) having large pilot tone ratios and known frequencies that may be targeted by the beamforming system. The SOI may be collected by the beamforming system along with other RF signals (e.g., coastal interferers) received in the same frequency range or band, and be processed by interference cancellation system components (e.g., that include adaptive filters that lock onto RF signals with the same primary modulation) of the beamforming system. The interference cancellation system components may process the desired SOI with other candidate RF signals (e.g., that include one or more unwanted interferer signals) by demodulating and testing the plurality of RF signals. The interference cancellation components may automatically select the desired demodulated SOI for output from among the plurality of other demodulated RF signals based on the presence of the one or more signal components (e.g., two pilot tones) within the structure of the SOI, without disturbance to the acoustic processing system, and in a manner that advantageously reduces the operational impact of interfering signals (e.g., coastal interferers) and environmental factors which contribute to port-swapping.

Advantageously, a SOI may be selected and output without the presence of other cochannel signals (e.g., interferer signals). For example, in the case where two or more radio transmitting devices (e.g., handheld RF transmitting devices or "walkie-talkies" or other type of RF transmitting radios) are keyed up to transmit at the same time and on the same frequency, selection of a SOI transmitted by only one of the devices may be made by a receiving device to the exclusion of other co-channel transmitted RF signals, so that only the SOI is output for audio reproduction and/or analysis without the presence of the other co-channel transmitted signals.

In one respect, disclosed herein is a method of selecting a signal of interest from a plurality of cochannel signals, the method including: receiving a plurality of cochannel signals, the plurality of cochannel signals including a signal of interest, wherein it is not known which of the plurality of signals is the signal of interest when the plurality of signals is received; and selecting the signal of interest from the plurality of cochannel signals based on the presence of at least one known internal or external structural feature of the signal of interest.

In another respect, disclosed herein is a method of processing a signal, the method including: receiving a first signal; and determining the presence of at least one known internal or external structural feature in the first signal.

In another respect, disclosed herein is an adaptive beamforming system including interference cancellation components, the interference cancellation components including: a non-real time weight calculation component having a modulated signal input and a calculated complex filter weight output; a signal specific weight selection and weight rearrangement component having a calculated complex filter weight input and a rearranged complex filter weight output, the calculated complex filter weight input of the signal specific weight selection and weight rearrangement component being coupled to the calculated complex filter weight output of the non-real time weight calculation component; and a real time weight application component having a modulated signal input coupled to the modulated signal input of the non-real time weight calculation component, a rearranged complex filter weight input coupled to the rearranged complex filter weight output of the signal specific weight selection and weight rearrangement component, and a filtered modulated signal output.

In another respect, disclosed herein is a signal processing system, including a signal selector configured to receive a first signal; and to determine the presence of at least one known internal or external structural feature in the first signal.

DESCRIPTION OF ILLUSTRATIVE EMBODIMENTS

Figure 1:
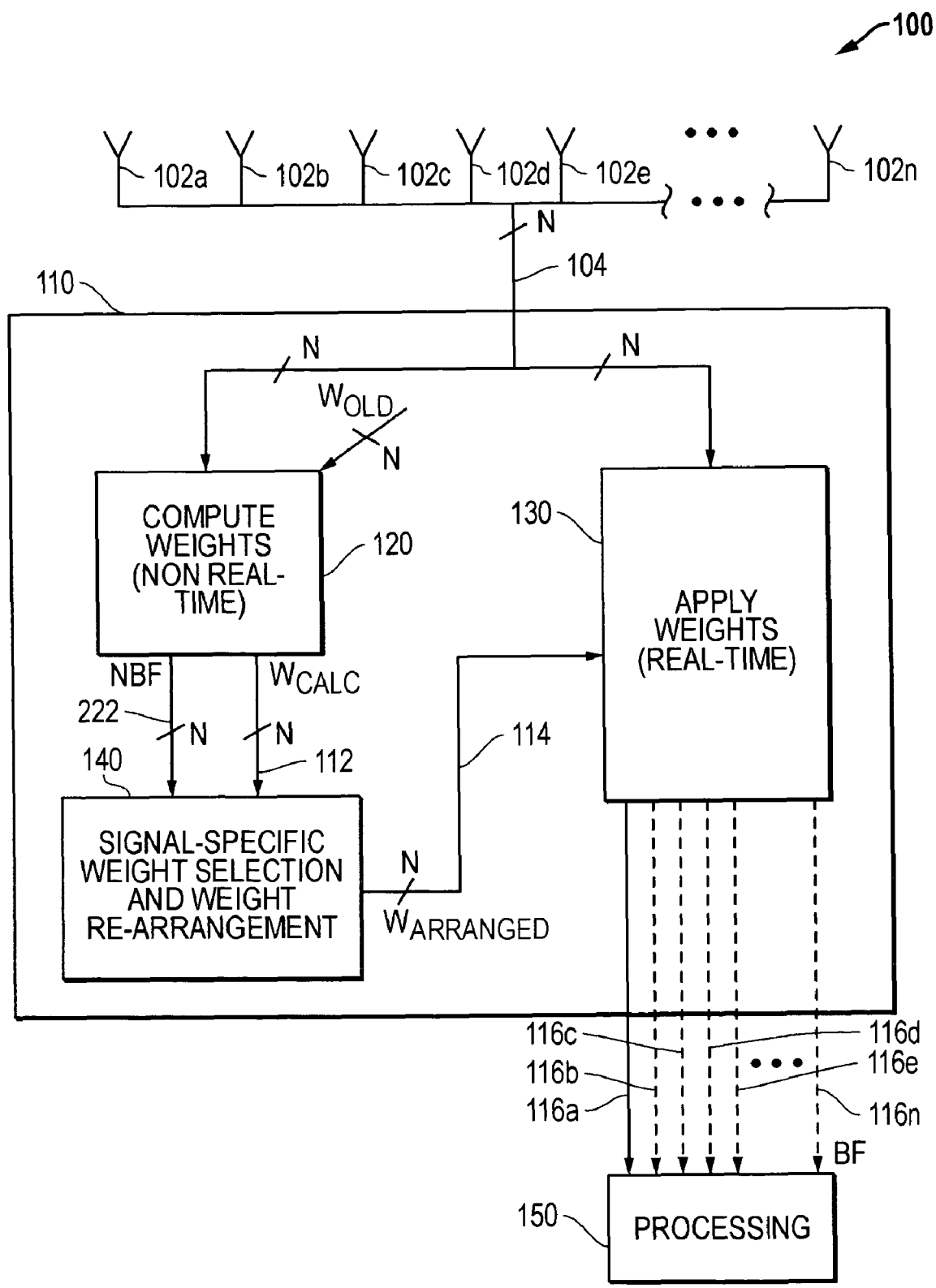
FIG. 1 is a block diagram of a beamforming system according to one embodiment of the disclosed methods and systems.

FIG. 1 is a simplified block diagram of a signal selector in this embodiment provided in the form of a beamforming system 110. As illustrated in FIG. 1, beamforming system 110 is coupled to a signal source in the form of a spatial antenna array 100 made up of a number N of multiple antenna elements $102_a$ through $102_n$. As shown, multiple antenna elements $102_a$ through $102_n$ of antenna array 100 are coupled to a corresponding number N input channels 104 of beamforming system 110. In this embodiment, the N received input channels 104 each containing the cochannel signals may include a modulated SOI (e.g., a modulated signal of FM or other modulation type that is emitted by a ocean-deployed sonobuouy or other modulated signal of interest) and a number of cochannel interferer signals. The function of the beamforming system 110 is to separate and individually output up to N cochannel signals on output channels $116_a$ through $116_n$. Components of beamforming system 110 may be implemented using any combination of hardware (e.g., CPU, microprocessor, digital signal processor (DSP), volatile and/or nonvolatile memory, etc.) and software, firmware, or combination thereof suitable for performing one or more of the functions of beamforming system 110 described elsewhere herein.

Although a spatial antenna array is provided as a signal source for the embodiment of FIG. 1, it will be understood that in other embodiments a signal source may be any other spatial or non-spatial source of a SOI combined with one or more other signals (e.g., interferer signals) at the same frequency range or band, including any other type of phased array antenna system or any other type of antenna system having multiple antenna elements. Additionally, although a signal selector in the form of a beamforming system is illustrated in FIG. 1, it will be understood that any other signal selector configuration suitable for receiving, demodulating and selecting a signal based on at least one internal structural feature of the given signal in demodulated form may be implemented. It will also be understood that a signal selector may be implemented to receive and select a signal based on at least one external structural feature of the given signal in modulated form, i.e., without requiring demodulation. Furthermore, the disclosed methods and systems may be implemented with any apparatus and/or system configured to receive signals of any frequency range or band suitable for propagation through a variety of media types including, but not limited to, gaseous medium (e.g., air), solid medium (e.g., earth, tissue), vacuum, etc.

Examples of types of apparatus and systems that may be implemented with the disclosed methods and systems include, but are not limited to, phased array radio frequency (RF) antennas or beamformers, sonar arrays (for transmitting/receiving acoustic signals), ultrasonic arrays (ultrasonic signals for medical and flaw analysis imaging purposes), radar arrays (e.g., for bi-static and mono-static radar), mobile and land based telecommunications devices, seismic arrays, etc. Examples of specific types of phased array RF antennas that may be implemented with the disclosed methods and systems include, but are not limited to, narrow band phased array antennas, broad band phased array antennas, etc. In one embodiment, the disclosed methods and systems may be implemented at any RF frequencies where phased array antennas may be employed (e.g., HF band, KA band, M band, etc.) In another exemplary embodiment, the disclosed methods and systems may be employed in surveillance applications (e.g., airborne, ship-based, space-based, submarine based, etc.) including, but not limited to, as a part of a tactical reconnaissance system.

Still referring to FIG. 1, beamforming system 110 is an adaptive beamforming system that includes interference cancellation components in the form of non-real time weight calculation component 120, signal specific weight selection and weight rearrangement component 140, and real time weight application component 130. As shown in FIG. 1, each of non-real time weight calculation component 120 and real time weight application component 130 receive the N input channels 104 composed of cochannel signals that include the SOI.

Weight calculation component 120 operates on a non real-time basis to compute a number N of calculated complex filter weights ($W_{CALC}$) 112 based at least partially on N real-time received input channels 104 and, in one exemplary embodiment, in combination with a number N of previously calculated complex weights ($W_{OLD}$) that may be provided, for example, from startup as all ones or from prior operations in the same frequency range or band (e.g., from a previous weight calculation ($W_{CALC}$ 112)), although computation using previously calculated complex weights is not necessary in other embodiments. Each of N calculated complex filter weights ($W_{CALC}$) 112 are output on a single output port 1 through N of weight calculation component 120 as filter vectors for multiplication with the N channels 104 to adjust the magnitude and phase of each of N channels 104 in order to optimize the output of beamforming system 110 by maximizing the response of one signal and that minimizes the response of the remaining signals by creating nulls in the direction of these undesired signals. In this regard, complex filter weights may be calculated in weight calculation component 120 to adaptively correct for such variables as source and/or receiver relative motion, environmental conditions, etc. Examples of suitable beamforming algorithms that may be implemented in the practice of the disclosed methods and systems include, but are not limited to, Multi-Target Least-Squares Constant Modulus Algorithm (MT LSCMA). Further information on beamforming algorithms and adaptive filtering techniques may be found described in Van Veen and Buckley, "*Beamforming: A Versatile Approach to Spatial Filtering*", IEEE ASSP Magazine, April 1988, pages 4-24; and in Joshi, Dietrich and Stutzman, "*Adaptive Beamforming Measurements Using Four-element Portable and Mobile Arrays*", IEEE Transactions on Antennas and Propagation, Volume 53, Issue 12, December 2005, pages 4065-4072; each of which is incorporated herein by reference.

As shown further in FIG. 1, weight calculation component 120 supplies each of calculated complex filter weights ($W_{CALC}$) 112 on its respective output port 1 through N to signal specific weight selection and weight rearrangement component 140, which selects and rearranges the output ports for calculated complex filter weights ($W_{CALC}$) 112 as described further herein. Signal specific weight selection and weight rearrangement component 140 then supplies the calculated complex filter weights ($W_{CALC}$) 112 as rearranged complex filter weights ($W_{ARRANGED}$) 114, to real time weight application component 130 for multiplication with N channels 104 to produce N output signals at N output ports (BF) 116a through 116n of beamforming system 110, and so that the SOI is automatically selected and output on a desired port (e.g., 116a) with no human operator intervention. As will be described further herein, signal specific weight selection and weight rearrangement component 140 is configured to select and rearrange the original output port sequence for calculated complex filter weights ($W_{CALC}$) 112 to a reordered output port sequence for complex filter weights ($W_{ARRANGED}$) 114 based on one or more internal structural feature/s of the SOI so that weight application component 130 uses complex filter weights ($W_{ARRANGED}$) 114 to always provide the SOI as an output signal on a particular beamforming system output port (e.g., 116a).

As shown, up to N separated cochannel signals may be provided via beamforming output ports (BF) 116a through 116n of this exemplary embodiment to a processing system 150 for further processing (e.g., acoustic processing of a sonobuoy SOI). In the illustrated embodiment, the SOI is provided at beamforming output port 116a. However, it will be understood that such further processing is optional and that a selected SOI and optionally one or more of the other signals may be output for any suitable purpose without further processing, e.g., SOI saved to volatile or non-volatile memory, output as audio signal for listening by a human operator, displayed for imaging and/or graphic form (e.g., ultrasonic imaging display, display on oscilloscope etc.). Furthermore, it is not necessary that a beamforming system provide an output signal at more than one beamforming system output port, e.g., beamforming system 110 may only provide the SOI on a single output port 116a, without providing additional output signals on output ports 116b through 116n and/or which need not even be present.

Figure 2:
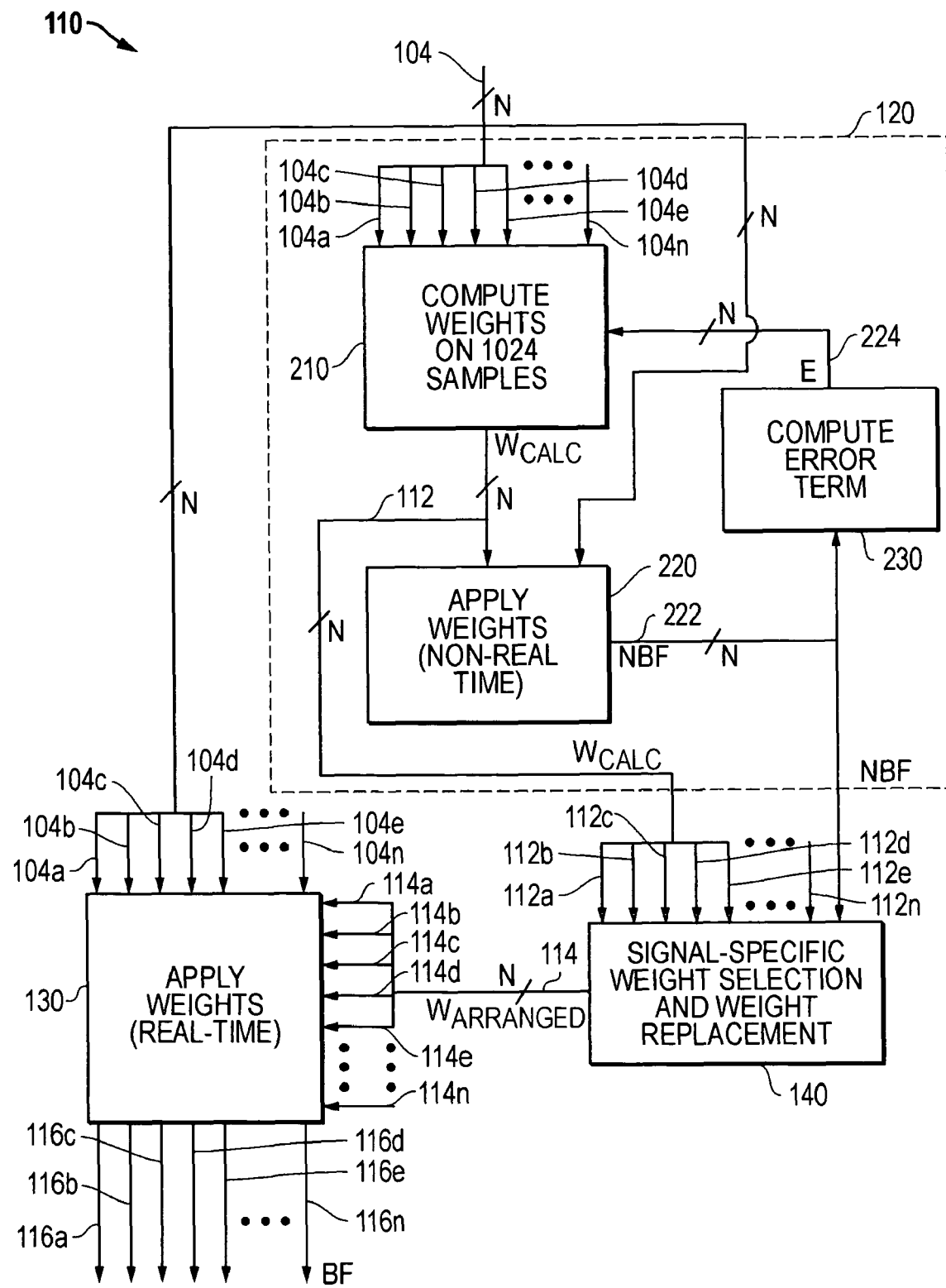
FIG. 2 is a block diagram of a beamforming system according to one embodiment of the disclosed methods and systems.

FIG. 2 is a simplified block diagram of beamforming system 110 showing components of non-real time weight calculation component 120 as they may be configured according to one exemplary embodiment of the disclosed methods and systems. As shown in FIG. 2, N channels 104 are provided as inputs 104a to 104n to non-real time weight calculation component 120, where complex filter weights are calculated for each port using weight computation processing component 210 and based on a number N of error terms (E) 224 that correspond to each of input signal ports 104a to 104n and that are provided by error computation component 230 in a manner as described below. In the illustrated exemplary case, weight computation processing component 210 uses blocks of data containing 1024 complex samples of a given signal (e.g., sampled at 320,000 complex samples per second), although it will be understood that any other suitable greater or lesser data block size and/or sampling rate may be used. As previously described, the N received cochannel signals may include a modulated SOI and a number (N−1) of cochannel interferer signals that are received on input signal ports 104a through 104n.

A number N of calculated weights ($W_{CALC}$) that correspond to cochannel signals of input signal ports 104a through 104n are calculated by weight computation processing component 210 and supplied to non-real time weight application component 220 and to signal specific weight selection and weight rearrangement component 140 on weight ports 112a through 112n as shown. In this embodiment, non-real time weight application component 220 is present to perform the function of multiplying the input signal ports 104a through 104n by the calculated weights ($W_{CALC}$) 112a through 112n so as to produce a number N of non-real-time output signals at N non-realtime beamformed data output ports (NBF) 222a through 222n that each correspond to one of the N cochannel signals of input signal ports 104a to 104n, and that are provided to error computation component 230 and to signal specific weight selection and weight rearrangement component 140. Based on output signals of non-realtime beamformed data output ports (NBF) 222a through 222n, error computation component 230 calculates a number N of error terms (E) 224a through 224n by comparing the non-realtime beamformed data output to a desired reference signal. Each of the error terms (E) 224a through 224n correspond to one of the N cochannel signals of input signal ports 104a to 104n and are supplied back to weight computation processing component 210 for purposes of computing the next set of calculated weights ($W_{CALC}$) 112.

Still referring to FIG. 2, signal specific weight selection and weight rearrangement component 140 receives calculated weights ($W_{CALC}$) 112a through 112n that each correspond to a given one of the N cochannel signals. As shown, signal specific weight selection and weight rearrangement component 140 also receives non-realtime beamformer output (NBF) signals 222a through 222n that each correspond to a given one of the up to N cochannel signals from the signal environment. As such, each of the calculated weights ($W_{CALC}$) 112a through 112n also corresponds to a given one of non-realtime beamformer output (NBF) signals 222a through 222n, respectively.

As will be described further herein, signal specific weight selection and weight rearrangement component 140 tests each of non-realtime beamformer output (NBF) signals 222a through 222n for presence of one or more internal structural features known a priori to be present in the SOI. In this exemplary embodiment, the signal specific weight selection and weight rearrangement component 140 tests each of non-realtime beamformer output (NBF) signals 222a through 222n for presence of two pilot tones known a priori to be present in the SOI. Once the specific non-realtime beamformer output (NBF) signal 222 (i.e., one of signals 222a through 222n) having the two pilot tones is identified and selected by signal specific weight selection and weight rearrangement component 140, the given calculated weight ($W_{CALC}$) 112 that corresponds to the selected non-realtime beamformer output (NBF) signal 222 (i.e., one of calculated weights ($W_{CALC}$) 112a through 112n) is also identified and selected. Signal specific weight selection and weight rearrangement component 140 then rearranges the order of calculated weights ($W_{CALC}$) 112 as necessary so that the selected calculated weight within ($W_{CALC}$) 112 corresponding to the SOI is always output to real time weight application component 130 by signal specific weight selection and weight rearrangement component 140 on the same output port 114, i.e., always on output port 114a in this illustrated exemplary embodiment.

As shown in FIG. 2, real time weight application component 130 applies rearranged complex filter weights ($W_{ARRANGED}$) 114a through 114n to input channels 104a through 104n to produce corresponding N output signals at N output ports (BF) 116a through 116n, respectively, of beamforming system 110. In this exemplary embodiment, the signal of output port (BF) 116a of real time weight application component 130 is always the SOI because rearranged complex filter weight ($W_{ARRANGED}$) 114a is always selected to be the calculated complex filter weight ($W_{CALC}$) 112 that corresponds to the SOI, even at those times when calculated weight ($W_{CALC}$) 112a does not correspond to the SOI due to port swapping effects or arbitrary algorithm initialization within non-real time weight calculation component 120.

It will be understood that the illustrated logic components of FIGS. 1 and 2 are exemplary only, and that the tasks of these components may be performed using any combination of hardware, software and/or firmware (or any combination of hardware, software and/or firmware components) that is suitable for performing the tasks thereof as described herein.

Figure 3:
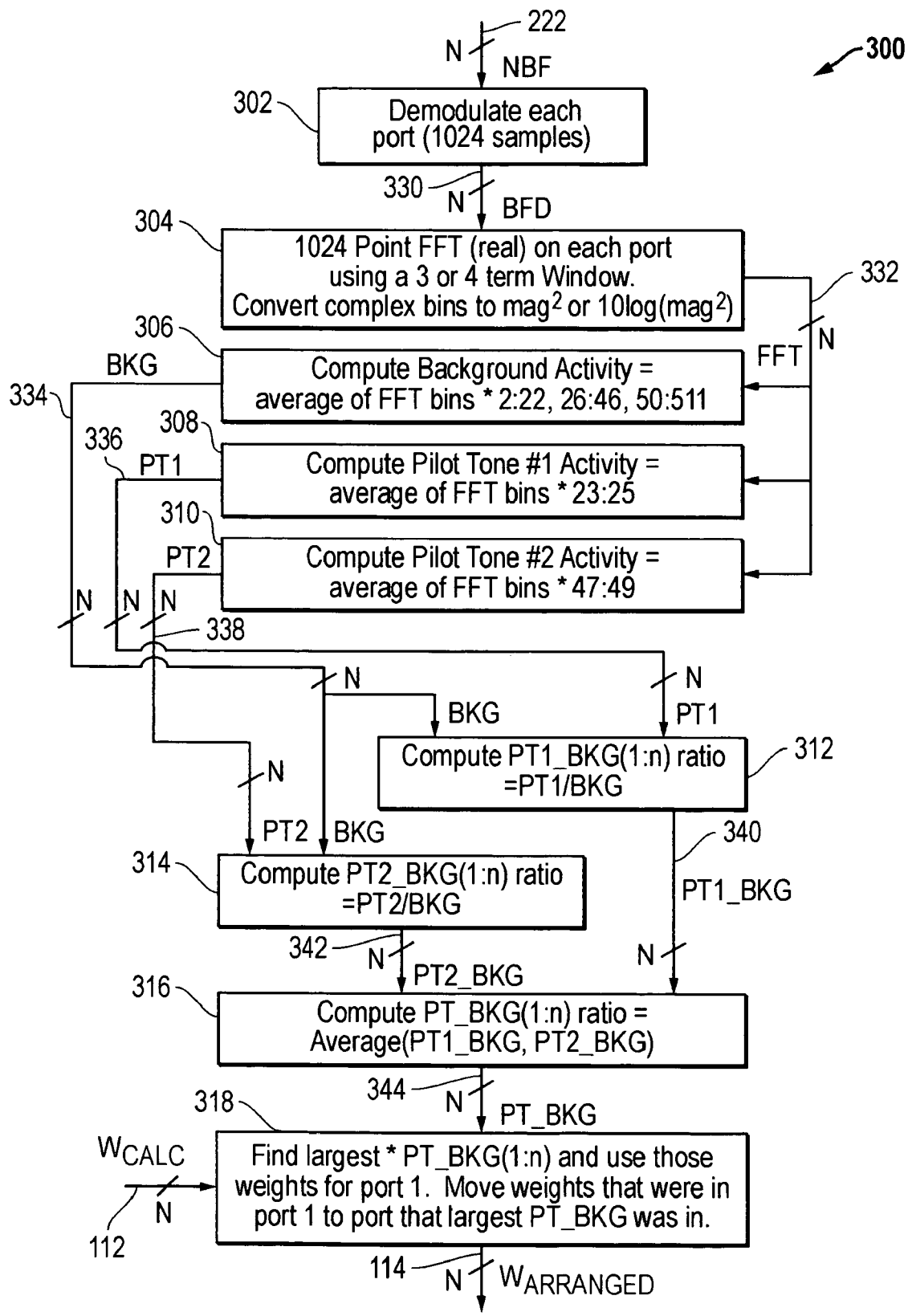
FIG. 3 is a flow diagram of methodology as it may be implemented according to one embodiment of the disclosed methods and systems.
Figure 4:
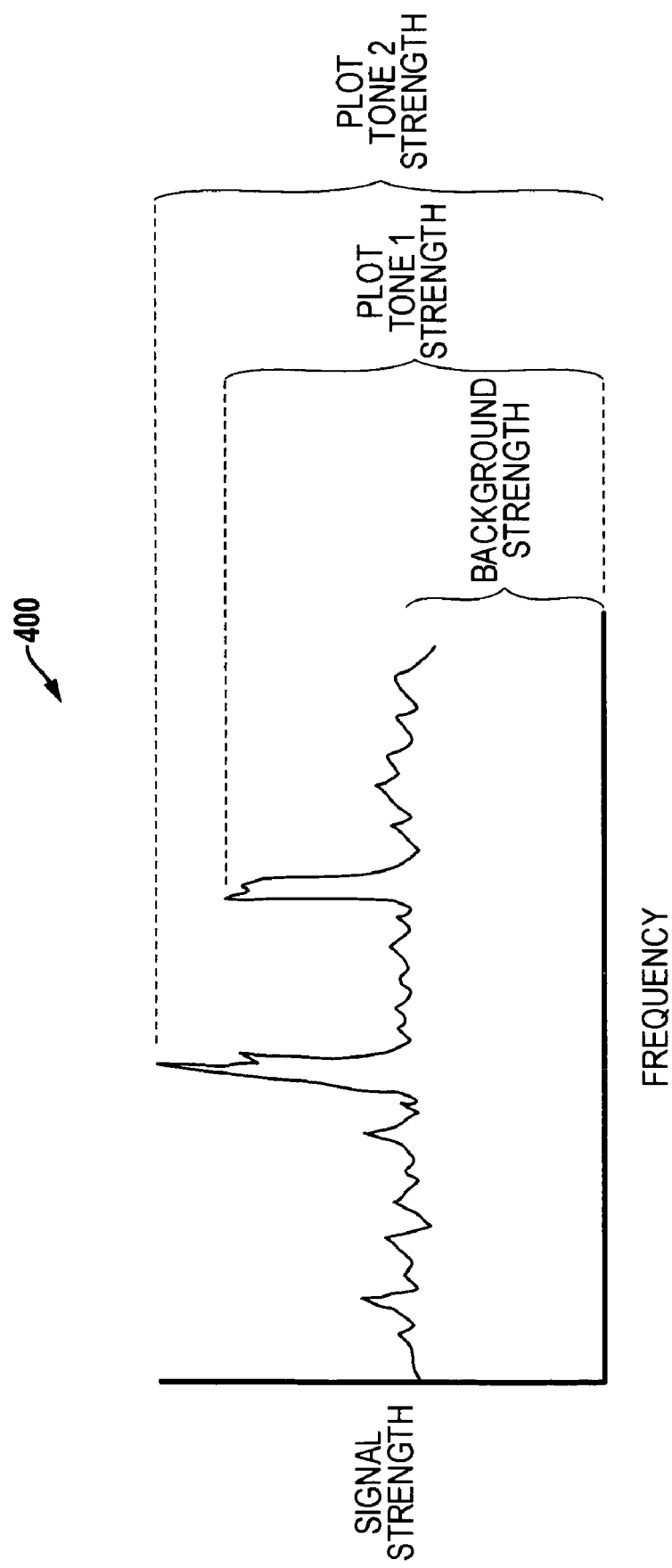
FIG. 4 is a simplified illustration of signal strength versus frequency for a signal of interest according to one embodiment of the disclosed methods and systems.

FIG. 3 is a flowchart illustrating methodology 300 as it may be implemented in one exemplary embodiment (e.g., by signal specific weight selection and weight rearrangement component 140) to select the calculated weight ($W_{CALC}$) 112 corresponding to a SOI that in this example includes two transmitted internal structural features present in the form of two pilot tones at known frequencies within the SOI. In this example, the two pilot tones are present as relatively strong signal components in the SOI that otherwise has relatively small amounts of energy (or averaged energy) present in other parts of its spectrum as illustrated for a SOI 400 in FIG. 4. As shown in FIG. 3, methodology 300 also rearranges the calculated weights ($W_{CALC}$) 112a through 112n so that the selected calculated weight corresponding to the SOI is always output on the same port, e.g. the first port or port 114a of signal specific weight selection and weight rearrangement component 140.

As will be described in further detail, methodology 300 may be implemented to test for the SOI by summing the spectral energy found in a pre-defined (e.g., narrow) frequency range around the known frequencies of the two pilot tones. Because the SOI otherwise has relatively small amounts of energy present in other parts of its spectrum, a comparison of spectral energy ratios (i.e., pilot tone ratio) of a plurality of cochannel interfering signals may be employed in one exemplary embodiment to identify the SOI from among the plurality of cochannel interfering signals, i.e., the SOI is expected to have the highest ratio of the summed spectral energy over the average of the rest of the energy in the signal as compared to the other cochannel signal/s. Upon identification of the highest spectral energy ratio associated with a given cochannel signal, the given cochannel signal is identified as the SOI and it corresponding calculated weight ($W_{CALC}$) 112 placed on the designated output port, e.g., 114a.

As shown in FIG. 3, non-realtime beamformer output (NBF) signals 222 are received as undemodulated signals (e.g., FM modulated signals) at ports 222a through 222n (e.g., by signal specific weight selection and weight rearrangement component 140), and these signals are each demodulated in step 302 (e.g., as data blocks containing 1024 samples or other suitable number of samples) to produce a corresponding number N of beamformed demodulated (BFD) signals 330a through 330n that correspond to non-realtime beamformer output (NBF) signals 222a through 222n, respectively. In step 304, Fast Fourier Transform (FFT) processing is performed on each demodulated beamformed demodulated (BFD) signal 330, e.g., using 1024 FFT (real) processing on each port using a 3 or 4 term window. The resulting complex FFT bins are converted to mag$^2$ or 10 log(mag$^2$), and the FFT data 332a through 332n corresponding to each of the spectral bins of the N beamformed demodulated (BFD) signals 330 is provided to activity computational steps 306, 308 and 310 as shown. It will be understood that a SOI may be any type of modulated signal that is demodulated in the practice of the disclosed methods and systems, e.g., modulated AM or FM signals, or that if the feature being exploited is in the undemodulated signal, the demodulation step 302 may be skipped.

Still referring to FIG. 3, background activity is computed in step 306 to produce the measure of background activity (BKG) 334a through 334n that correspond to non-realtime beamformer output (NBF) signals 222a through 222n, respectively. In this regard, background activity (BKG) 334 for each signal may be computed by averaging FFT bins of FFT data 332a through 332n for each respective port. Similarly, first pilot tone activity (PT1) data signals 336 for each signal may be computed in step 308 by averaging FFT bins of FFT data 332a through 332n for each respective port, and second pilot tone activity (PT2) data signals 336 for each signal may be computed in step 310 by averaging FFT bins of FFT data 332a through 332n for each respective port. The exemplary bin numbers of steps 306 through 310 assumes data obtained using 320,000 sample per second sampling rate, it being understood that bin number may be adjusted for other sampling rates.

Next, in steps 312 and 314, pilot tone-to-background activity ratios corresponding to each of the N number of non-realtime beamformer output (NBF) signals 222a thought 222n are calculated for the first and second pilot tones using the background activity (BKG) data signals 334, first pilot tone activity (PT1) data signals 336 and second pilot tone activity (PT2) data signals 338 that correspond to each respective port. In this regard, a first pilot tone-to-background activity ratio (PT1_BKG) 340a through 340n is computed in step 312 corresponding to each of non-realtime beamformer output (NBF) signals 222a thought 222n by computing the ratio of each first pilot tone activity (PT1) data signal 336a through 336n to the respective background activity (BKG) data signal 334a through 334n that corresponds to each of non-realtime beamformer output (NBF) signals 222a thought 222n. Similarly, a second pilot tone-to-background activity ratio (PT2_BKG) 342a to 342n is computed in step 314 corresponding to each of non-realtime beamformer output (NBF) signals 222a thought 222n by computing the ratio of each second pilot tone activity (PT2) data signal 338a through 338n to the respective background activity (BKG) data signal 334a through 334n that corresponds to each of non-realtime beamformer output (NBF) signals 222a thought 222n.

In step 316, the average of pilot tone-to-background activity ratio (PT_BKG) 344 is calculated corresponding to each of the N number of non-realtime beamformer output (NBF) signals 222a thought 222n by averaging the first pilot tone-to-background activity ratio (PT1_BKG) 340 and second pilot tone-to-background activity ratio (PT2_BKG) 342 that correspond to each respective port. In this regard, an average pilot tone-to-background activity ratio (PT_BKG) 344a through 344n is computed in step 316 corresponding to each of non-realtime beamformer output (NBF) signals 222a thought 222n by averaging each of first pilot tone-to-background activity ratio (PT1_BKG) 340a thought 340n with the corresponding respective second pilot tone-to-background activity ratio (PT2_BKG) 342a thought 342n.

In step 318, the largest average pilot tone-to-background activity ratio (PT_BKG) 344 (i.e., the largest value of average pilot tone-to-background activity ratio 344a though 344n computed in step 316) is then identified, and the calculated complex filter weight ($W_{CALC}$) 112 that corresponds to this largest average pilot tone-to-background activity ratio (PT_BKG) 344 is then selected and moved to a port that is designated to correspond to the SOI (e.g., port 1 in this exemplary embodiment). The calculated complex weight ($W_{CALC}$) 112 that was originally assigned to the designated port may be optionally moved to the port from which the calculated complex filter weight ($W_{CALC}$) 112 that corresponds to this largest average pilot tone-to-background activity ratio (PT_BKG) 344 was moved, or may be rearranged to another port in any other desired manner. If the calculated complex filter weight ($W_{CALC}$) 112 that corresponds to this largest average pilot tone-to-background activity ratio (PT_BKG) 344 is already assigned to the port designated for the SOI, it is not moved. As shown in FIG. 3, the rearranged complex filter weights ($W_{ARRANGED}$) 114 are then output, e.g., by signal specific weight selection and weight rearrangement component 140 to real time weight application component 130 of FIGS. 1 and 2.

Automatic and dynamic selection of the calculated weight ($W_{CALC}$) 112 corresponding to a SOI may be optionally accomplished by iteratively repeating the steps of FIG. 3 to rearrange the calculated weights ($W_{CALC}$) 112a through 112n so that the selected calculated weight corresponding to the SOI is always output on the same port using automatic and continuous port reassignment as required to maintain the calculated weight ($W_{CALC}$) 112 corresponding to a SOI on the port that is designated for the SOI.

Although FIG. 3 illustrates all rearranged complex filter weights ($W_{ARRANGED}$) 114 being output for all ports in step 318, it is alternatively possible that rearranged complex filter weights ($W_{ARRANGED}$) 114 for only a selected subset of the ports may be output with the remaining calculated complex filter weight ($W_{CALC}$) 112 being discarded. In one example, only the rearranged complex filter weight ($W_{ARRANGED}$) 114 corresponding to the port designated for the SOI may be output.

It will be understood that the particular methodology illustrated and described in relation to FIG. 3 is exemplary only and that any other methodology suitable for selecting a signal of interest (SOI) based on one or more internal structural feature/s of the SOI may be employed, e.g., including for selecting a signal of interest (SOI) based on internal or external structural features other than pilot tones. With regard to the exemplary embodiment of FIG. 3, it will be understood that the steps of FIG. 3 may be performed in any other sequential order that is suitable for selecting a signal of interest (SOI) based on two pilot tones. It is also possible that the methodology of FIG. 3 may be implemented with fewer, additional and/or alternative steps. For example, in one possible alternative embodiment, the disclosed methodology may be implemented to select calculated weights ($W_{CALC}$) 112 corresponding to more than one SOI (e.g., that each include one or more pilot tones at known frequency or frequencies), and to rearrange the calculated weights ($W_{CALC}$) 112a through 112n so that the selected calculated weights corresponding to the respective multiple SOIs are always output on the same output ports (BF), e.g. the first and second ports 116a and 116b for a respective first and second SOI. In another exemplary embodiment, the number of the output port (BF) 116 may be identified to which a calculated weight ($W_{CALC}$) 112 corresponding to a SOI is output at any given time rather than rearranging the ports to which the calculated weight ($W_{CALC}$) 112 corresponding to the SOI is output. In such an embodiment, the particular output port (BF) 116a through 116n may be switched for output or analysis as necessary to follow the particular port number to which the calculated weight ($W_{CALC}$) 112 corresponding to a SOI is output.

Figure 5:
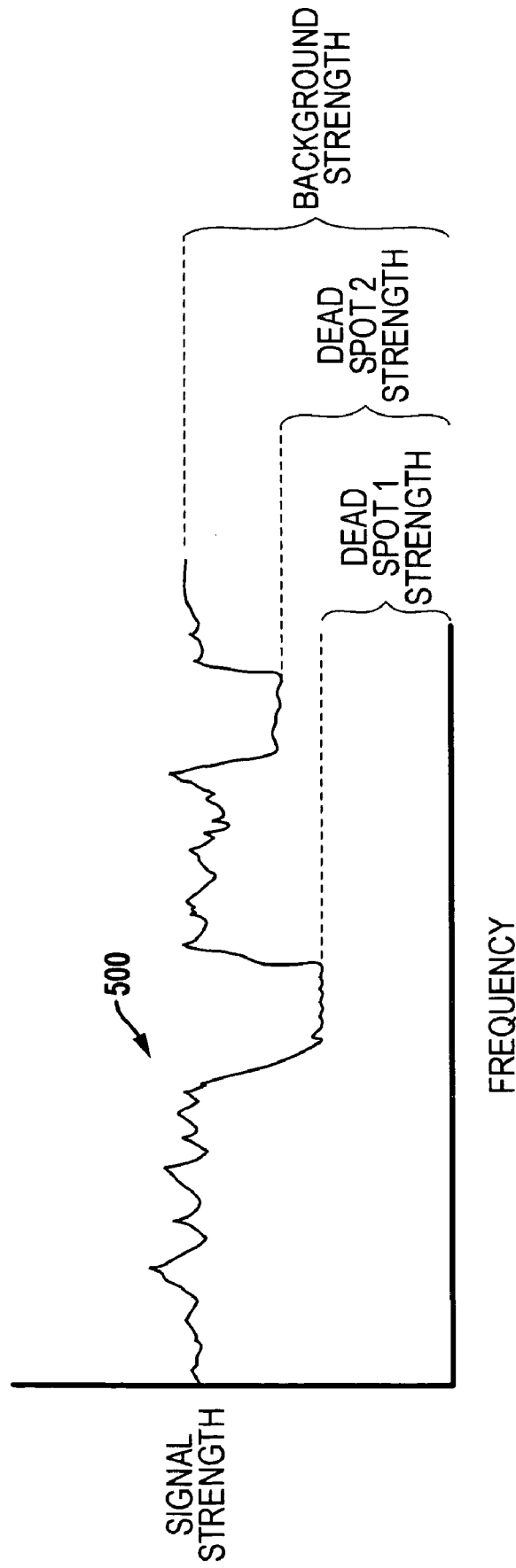
FIG. 5 is a simplified illustration of signal strength versus frequency for a signal of interest according to one embodiment of the disclosed methods and systems.

Furthermore, it will be understood that similar methodology may be implemented to select a SOI based on other types of internal or external structural feature/s of a SOI. For example, the spectral energy found in a pre-defined (e.g., narrow) frequency range around the known frequency of a dead spot or dead spots within a SOI maybe summed and a comparison of spectral energy ratios made be made to identify the SOI from among the plurality of cochannel interfering signals, i.e., in this case the SOI is expected to have the lowest ratio of the summed spectral energy over the average of the rest of the energy in the signal as compared to the other cochannel signal/s. FIG. 5 illustrates two such dead spots in a SOI that are present as relatively weak signal components in a SOI 500 that otherwise has relatively larger amounts of energy present in other parts of its spectrum.

While the invention may be adaptable to various modifications and alternative forms, specific embodiments have been shown by way of example and described herein. However, it should be understood that the invention is not intended to be limited to the particular forms disclosed. Rather, the invention is to cover all modifications, equivalents, and alternatives falling within the spirit and scope of the invention as defined by the appended claims. Moreover, the different aspects of the disclosed methods and systems may be utilized in various combinations and/or independently. Thus the invention is not limited to only those combinations shown herein, but rather may include other combinations.

What is claimed is:

1. A method of selecting a signal of interest from a plurality of cochannel signals for output on a designated output port among a plurality of output ports, the method comprising:
   first receiving a plurality of cochannel signals at each of a plurality of input channels that each corresponds to a respective one of said output ports, said plurality of cochannel signals including a signal of interest, wherein it is not known which of said plurality of signals is said signal of interest when said plurality of signals is received at each of said input channels;
   then calculating a plurality of complex filter weight sets based on said received plurality of cochannel signals, each of said plurality of said complex filter weight sets corresponding to one of said plurality of received cochannel signals, and one of said complex filter weight sets corresponding to said signal of interest;
   then rearranging a sequence of said plurality of complex filter weight sets for application to said plurality of input channels based on the presence of at least one known internal or external structural feature of said signal of interest such that said complex filter weight set corresponding to said signal of interest is always ordered for application to said plurality of input channels so as to maintain the signal of interest on the designated output port; and
   then applying each of said plurality of complex filter weight sets to said plurality of input channels according to said rearranging in order to produce one of said plurality of cochannel signals as a separated signal in filtered form on each of the plurality of output ports and such that the separated signal of interest is always produced on the designated output port when the identity of the complex filter weight set corresponding to said signal of interest changes over time.

2. The method of claim 1, wherein said plurality of cochannel signals are received in modulated form, and wherein said method further comprises performing said step of rearranging the sequence of said plurality of complex filter weight sets for application to said plurality of input channels based on the presence of at least one known external structural feature of said signal of interest.

3. The method of claim 1, wherein said plurality of cochannel signals are received in modulated form; and wherein said method further comprises:
   demodulating said plurality of modulated signals to form a plurality of demodulated signals including said signal of interest in demodulated form; and
   rearranging the sequence of said plurality of complex filter weight sets for application to said plurality of input channels based on the presence of said at least one known internal structural feature in said signal of interest in demodulated form.

4. The method of claim 3, wherein said plurality of modulated cochannel signals comprise radio frequency (RF) signals; and wherein said at least one known internal structural feature comprises a known relationship of signal strength versus frequency in said signal of interest.

5. The method of claim 3, wherein said plurality of modulated cochannel signals comprise radio frequency (RF) signals; and wherein said at least one known internal structural feature comprises a pilot tone.

6. The method of claim 3, wherein said plurality of modulated cochannel signals comprise radio frequency (RF) signals; and wherein said method further comprises:
providing a beamforming system having an input coupled to a spatial antenna array, the beamforming system comprising the plurality of input channels and the plurality of output ports;
receiving said plurality of modulated cochannel signals at said spatial antenna array;
providing said plurality of received modulated cochannel signals from said spatial antenna to the plurality of input channels of said beamforming system;
performing said steps of said demodulating, calculating a plurality of complex filter weight sets, rearranging the sequence of said plurality of complex filter weight sets and applying each of said plurality of complex filter weight sets to said plurality of input channels within said beamforming system; and
providing said modulated signal of interest on the designated output port of said beamforming system.

7. The method of claim 6, wherein said method comprises:
calculating the plurality of complex filter weight sets based on said received plurality of modulated cochannel signals, each of said plurality of said complex filter weight sets corresponding to one of said plurality of received modulated cochannel signals, and one of said complex filter weight sets corresponding to said modulated signal of interest;
rearranging the sequence of said plurality of complex filter weight sets for application to said plurality of input channels based on the presence of at least one known internal structural feature in said signal of interest in demodulated form such that said complex filter weight set corresponding to said signal of interest is always applied to said plurality of input channels so as to maintain the signal of interest on the designated output port; and
applying each of said plurality of complex filter weight sets to a corresponding respective one of said plurality of input channels according to said rearranging in order to produce one of said plurality of cochannel signals as a separated modulated signal on each of the plurality of output ports and such that the separated signal of interest is always produced on the designated output port.

8. The method of claim 1, wherein said internal or external structural feature of said signal of interest is transmitted as part of said signal of interest; and wherein said method further comprises rearranging the sequence of said plurality of complex filter weight sets for application to said plurality of input channels based on the presence of at least one known transmitted internal or external structural feature of said signal of interest.

9. A method of processing a signal, comprising:
receiving a plurality of signals at each of a plurality of input channels, the plurality of received signals including a first signal;
calculating a different complex filter weight set based on each of said received plurality of signals, each of said calculated complex filter weight sets corresponding to one of said plurality of received signals, and one of said complex filter weight sets corresponding to said first signal;
determining the presence of at least one known internal or external structural feature in said received first signal;
rearranging a sequence of the plurality of complex filter weight sets for application to said plurality of input channels based on the presence of the at least one known internal or external structural feature of said first signal such that a complex filter weight set corresponding to said first signal is always ordered for application to said plurality of input channels in a sequence that acts to maintain the first signal on a designated output port; and
always applying said complex filter weight set corresponding to said first signal to said plurality of input channels in an order that acts to produce a separated first signal on the designated output port when the identity of the complex filter weight set corresponding to said first signal changes over time.

10. The method of claim 9, wherein said first signal is received in unmodulated form, and wherein said method further comprises determining the presence of at least one known external structural feature in said demodulated first signal.

11. The method of claim 9, wherein said first signal is received in modulated form, and wherein said method further comprises:
demodulating said modulated first signal to form a demodulated first signal; and
determining the presence of at least one known internal structural feature in said demodulated first signal.

12. The method of claim 11, further comprising:
receiving a plurality of modulated cochannel signals, said plurality of modulated cochannel signals including said modulated first signal;
demodulating each of said plurality of cochannel signals to form a plurality of demodulated signals including said demodulated first signal;
processing each of said plurality of demodulated cochannel signals to determine the presence of said at least one known internal structural feature in said demodulated first signal.

13. The method of claim 12, wherein it is not known which of said plurality of modulated signals is said modulated first signal when said plurality of modulated signals is received; and further comprising performing said step of rearranging the sequence of said plurality of complex filter weight sets for application to said plurality of input channels based on the determined presence of said at least one known internal structural feature in said demodulated first signal.

14. The method of claim 13, further comprising calculating a plurality of complex filter weight sets based on said received plurality of modulated cochannel signals, each of said plurality of said complex filter weight sets corresponding to one of said plurality of received modulated cochannel signals; and multiplying said complex filter weight set corresponding to said first signal by said plurality of input channels in a sequence that acts to produce a separated modulated first signal in filtered form on the designated output port.

15. The method of claim 11, wherein said modulated first signal comprises a radio frequency (RF) signal.

16. The method of claim 11, wherein said at least one known internal structural feature comprises a known relationship of signal strength versus frequency in said demodulated first signal.

17. The method of claim 16, wherein said at least one known internal structural feature comprises a pilot tone.

18. The method of claim 9, wherein said internal or external structural feature of said first signal is transmitted as part of said first signal; and wherein said method further comprises determining the presence of said at least one known transmitted internal or external structural feature in said first signal.

19. An adaptive beamforming system comprising interference cancellation components, said interference cancellation components comprising:
a non-real time weight calculation component having a modulated signal input for receiving a plurality of cochannel signals at each of a plurality of input channels, and a calculated complex filter weight output outputting a plurality of non-real time calculated complex filter weight sets based on the received plurality of cochannel signals, each of said plurality of said complex filter weight sets corresponding to one of said plurality of received cochannel signals, and one of said complex filter weight sets corresponding to a signal of interest within said plurality of received cochannel signals;
a signal specific weight selection and weight rearrangement component having a calculated complex filter weight input and a rearranged complex filter weight output, said calculated complex filter weight input of said signal specific weight selection and weight rearrangement component being coupled to said calculated complex filter weight output of said non-real time weight calculation component, and the rearranged complex filter weight output outputting said plurality of complex filter weight sets in a sequence that is reordered based on the presence of at least one known internal or external structural feature of said signal of interest; and
a real time weight application component having a modulated signal input coupled to said modulated signal input of said non-real time weight calculation component for receiving the plurality of cochannel signals at each of a plurality of input channels, a rearranged complex filter weight input coupled to said rearranged complex filter weight output of said signal specific weight selection and weight rearrangement component for receiving the reordered sequence of complex filter weight sets, and a filtered modulated signal output including a plurality of output ports for outputting one of said plurality of cochannel signals in real time as a separated signal in filtered form on each of the plurality of output ports;
wherein the signal specific weight selection and weight rearrangement component is configured to output said plurality of complex filter weight sets in a sequence that is reordered based on the presence of the at least one known internal or external structural feature of said signal of interest such that the separated signal of interest is always produced on a designated output port of the signal specific weight selection and weight rearrangement component when the identity of the complex filter weight set corresponding to said signal of interest changes over time.

20. A signal processing system, comprising a signal selector configured to:
receive a plurality of signals at each of a plurality of input channels, the plurality of received signals including a first signal;
calculate a different complex filter weight set based on each of said received plurality of signals, each of said calculated complex filter weight sets corresponding to one of said plurality of received signals, and one of said complex filter weight sets corresponding to said first signal;
determine the presence of at least one known internal or external structural feature in said received first signal;
rearrange a sequence of the plurality of complex filter weight sets for application to said plurality of input channels based on the presence of the at least one known internal or external structural feature of said first signal such that a complex filter weight set corresponding to said first signal is always ordered for application to said plurality of input channels in a sequence that acts to maintain the first signal on a designated output port; and
apply said complex filter weight set corresponding to said first signal to said plurality of input channels in a sequence that acts to always produce a separated first signal on the designated output port when the identity of the complex filter weight set corresponding to said first signal changes over time.

21. The system of claim 20, wherein said signal selector is further configured to receive the first signal in modulated form; and to determine the presence of at least one known external structural feature in said modulated first signal.

22. The system of claim 20, wherein said signal selector is further configured to receive the first signal in modulated form; to demodulate said modulated first signal to form a demodulated first signal; and to determine the presence of at least one known internal structural feature in said demodulated first signal.

23. The system of claim 22, wherein said signal selector is further configured to receive a plurality of modulated cochannel signals at each of the plurality of input channels, said plurality of modulated cochannel signals including said modulated first signal; to demodulate each of said plurality of cochannel signals to form a plurality of demodulated signals including said demodulated first signal; and to process each of said plurality of demodulated cochannel signals to determine the presence of said at least one known internal structural feature in said demodulated first signal.

24. The system of claim 23, wherein said signal selector is further configured to:
multiply said selected first one of said plurality of complex filter weight sets by said plurality of signals at said plurality of input channels to always produce the separated modulated first signal in filtered form on the designated output port when the identity of the complex filter weight set corresponding to said first signal changes over time.

25. The system of claim 22, wherein said at least one known internal structural feature comprises a known relationship of signal strength versus frequency in said demodulated first signal.

26. The system of claim 22, wherein said at least one known internal structural feature comprises a pilot tone.

27. The system of claim 22, wherein said first signal comprises a radio frequency (RF) signal.

28. The system of claim 20, comprising a signal selector configured to determine the presence of at least one known internal or external structural feature transmitted as part of said first signal.

* * * * *